United States Patent [19]

Mouri et al.

[11] 4,366,541
[45] Dec. 28, 1982

[54] METHOD AND SYSTEM FOR ENGINE CONTROL

[75] Inventors: Yasunori Mouri, Katsuta; Seiji Suda, Mito; Masami Shida, Katsuta; Toshio Furuhashi, Mito, all of Japan

[73] Assignee: Hitachi, Ltd., Tokyo, Japan

[21] Appl. No.: 139,264

[22] Filed: Apr. 11, 1980

[30] Foreign Application Priority Data

Apr. 13, 1979 [JP] Japan .................................. 54-44364

[51] Int. Cl.³ .......................... F02B 3/04; F02D 5/02; G06F 15/20
[52] U.S. Cl. ............................... 364/431.05; 123/480; 123/486; 364/431.12; 364/571
[58] Field of Search ................ 364/431; 123/440, 480, 123/486, 571; 60/285, 276

[56] References Cited

U.S. PATENT DOCUMENTS

| | | | |
|---|---|---|---|
| 4,130,095 | 12/1979 | Bowler et al. | 60/276 X |
| 4,181,944 | 1/1980 | Yamauchi et al. | 364/431.06 |
| 4,200,064 | 4/1980 | Engele | 123/486 X |
| 4,201,161 | 5/1980 | Sasayama et al. | 364/431 X |
| 4,210,112 | 7/1980 | Nakamura et al. | 123/571 |
| 4,227,507 | 10/1980 | Takase et al. | 123/440 |
| 4,235,204 | 11/1980 | Rice | 364/431.05 X |
| 4,294,212 | 10/1981 | Aoki | 123/440 |

*Primary Examiner*—Felix D. Gruber
*Attorney, Agent, or Firm*—Antonelli, Terry & Wands

[57] ABSTRACT

In a method and a system for engine control an engine control signal is generated on the basis of a signal produced at each moment from at least one sensor for detecting the operating condition of the engine, the control signal being used for engine control. In order to attain the proper engine operating condition, data representative of the detection signal from the sensor is adjusted in advance, and data for correcting the sensor output is calculated from said adjustment value, the correction data being stored in a memory. While the engine is running, the data representative of the detection signal from the sensor is corrected by the correction data stored in the memory, and this corrected detection signal representative data is used to produce the control signal.

33 Claims, 9 Drawing Figures

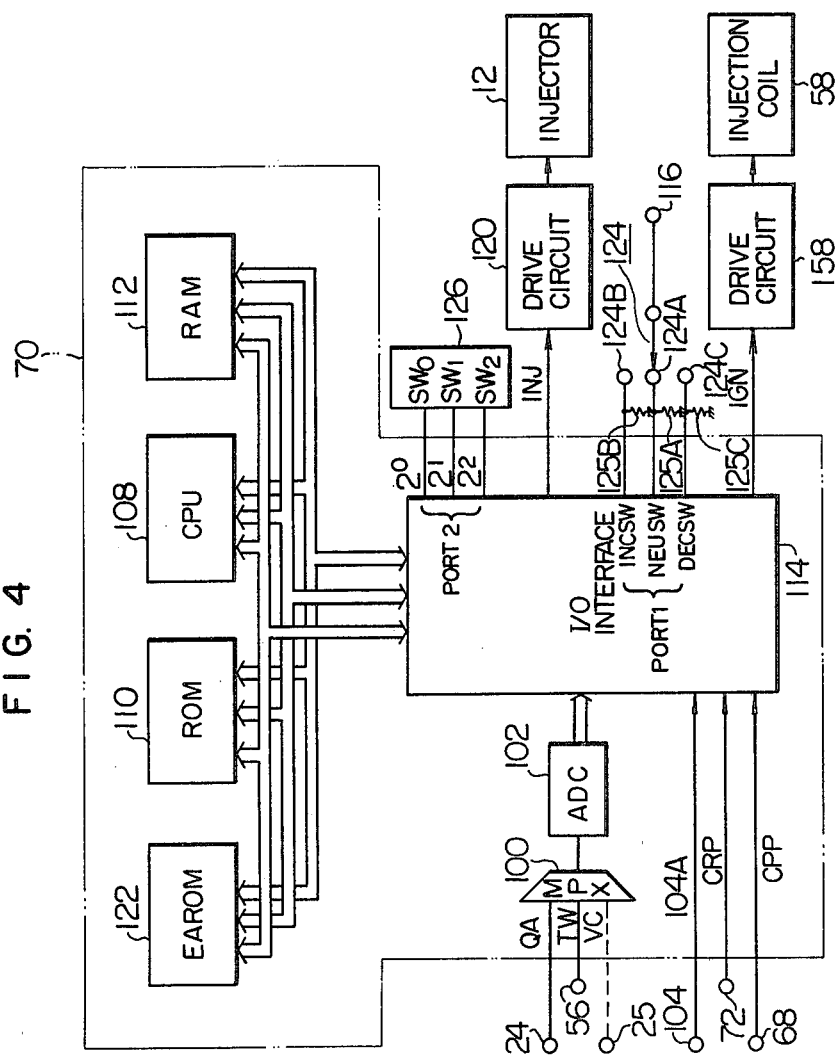

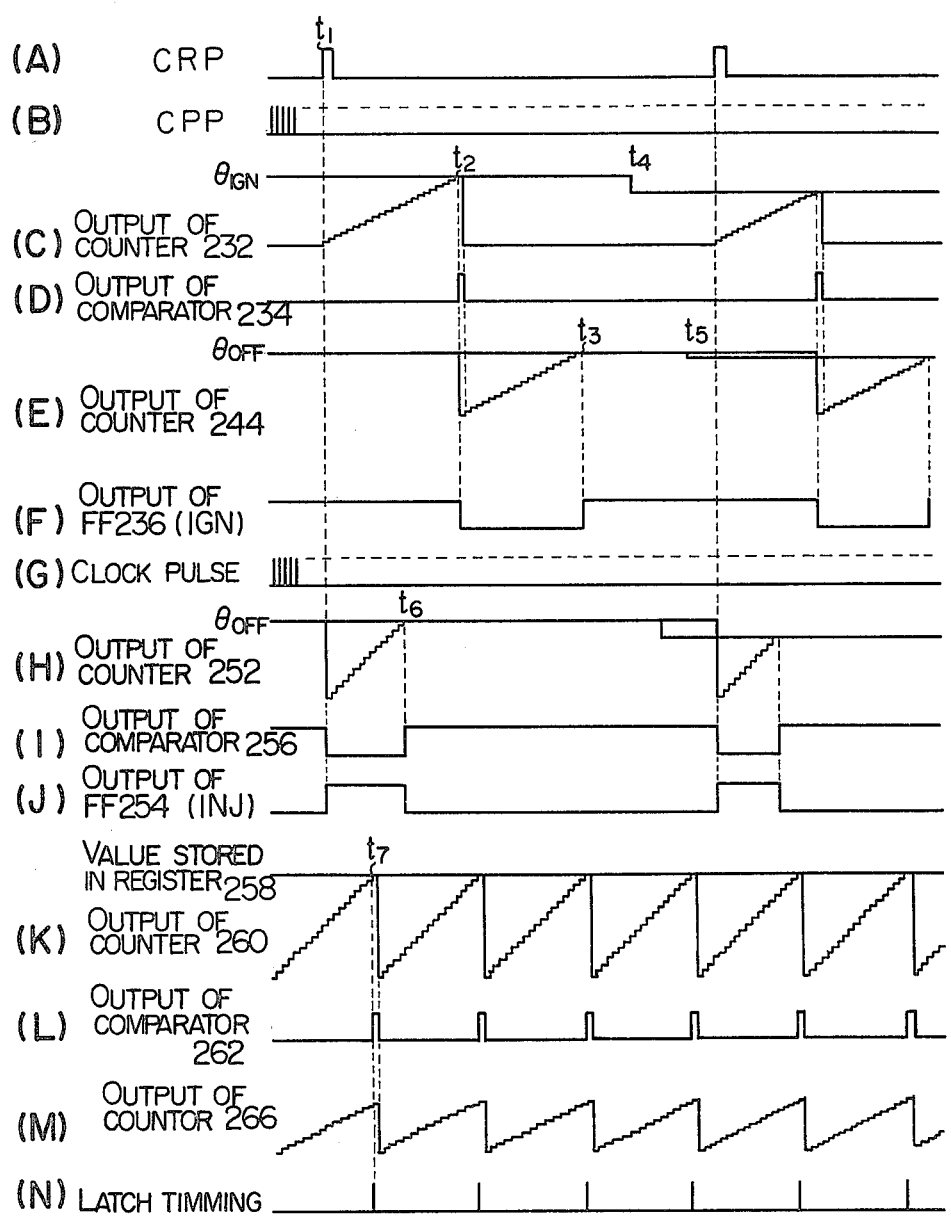

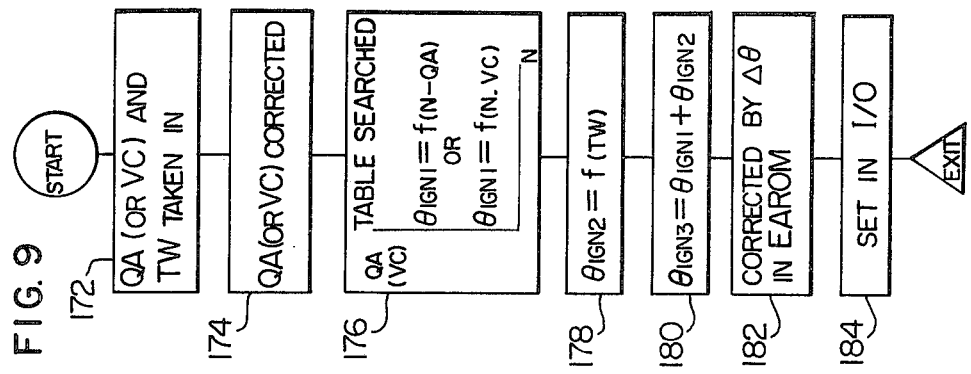
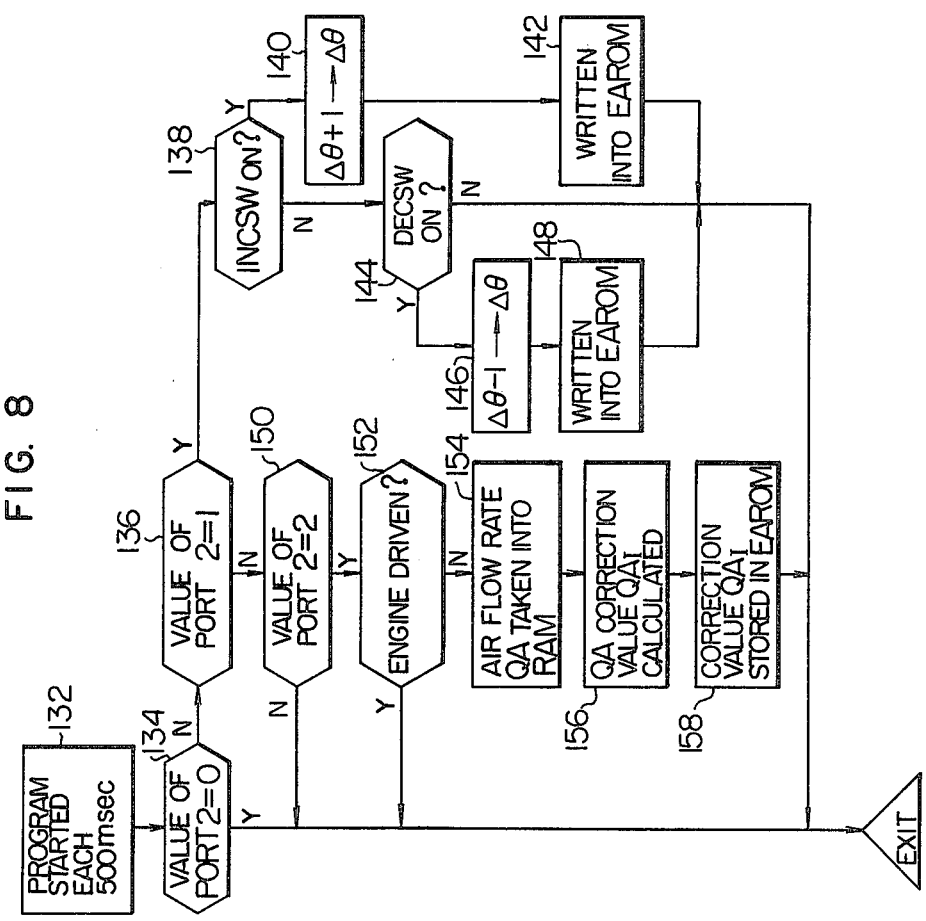

METHOD AND SYSTEM FOR ENGINE CONTROL

The present invention relates to a method and a system for controlling an engine, or more in particular to a method and a system for engine control in which electrical outputs of sensors are adjusted at the time of delivery and subsequent inspections of a motor vehicle carrying the particular engine to assure engine operation under optimum conditions.

For effective driving of the engine of a motor vehicle, it is very important for the sensors to be subjected to fine adjustment to control them at the output of the best setting. For this purpose, various sensors such as a crank angle sensor are subjected to zero-setting and other adjustments at the time of delivery or subsequent regular inspections in order to eliminate the lack of uniformity of the engine operating conditions which otherwise might be caused by the variations in the characteristics of each of the sensors. The problem, however, is that considerable labor and time are required for performing these adjustments satisfactorily.

U.S. Pat. Nos. 4,130,095 and 4,181,944, U.S. patent application Ser. No. 950,572 filed Aug. 21, 1978, now U.S. Pat. No. 4,201,161, and Japanese Patent Application No. 17,329/79 filed Feb. 19, 1979, which corresponds to U.S. Pat. No. 4,298,941, disclose a system in which an optimum control signal is read out of the table stored in a memory on the basis of the signals detected from the sensors respectively and this control signal is used to control the engine. These prior art systems fail to refer to adjustment of the output signals of the sensors.

Accordingly, it is an object of the present invention to provide a method and a system for engine control in which the effect of various sensors for detecting signals required for engine control are electrically adjusted at the time of delivery or subsequent regular inspections of the motor vehicle carrying the particular engine thereby to set the engine in the optimum operating condition.

According to the present invention, there is provided a method and a system for electronic engine control wherein correction values for correcting the outputs of the sensors are stored in memory means beforehand so that the sensor outputs are corrected by these correction values in memory before controlling the engine. In other words, at the time of delivery or subsequent required inspections, correction values are set in the memory means, thus setting the engine in the optimum condition electronically equivalent to mechanical adjustments of the mounting positions of the sensors, fine adjustment and zero setting thereof.

The above and other objects, features and advantages will be made apparent by the detailed description taken in conjunction with the accompanying drawings, in which:

FIG. 4 is a block diagram showing a configuration of the engine control system;

FIG. 5 is a diagram showing a switch selection pattern for selecting a sensor to be adjusted;

FIG. 7 is a time chart showing waveforms of inputs and outputs at the essential parts in FIG. 6;

FIG. 8 is a flowchart showing an example of a program for adjusting a representative sensor; and FIG. 9 is a flowchart showing a program for producing an engine control signal at the time of engine starting.

Figure 1:
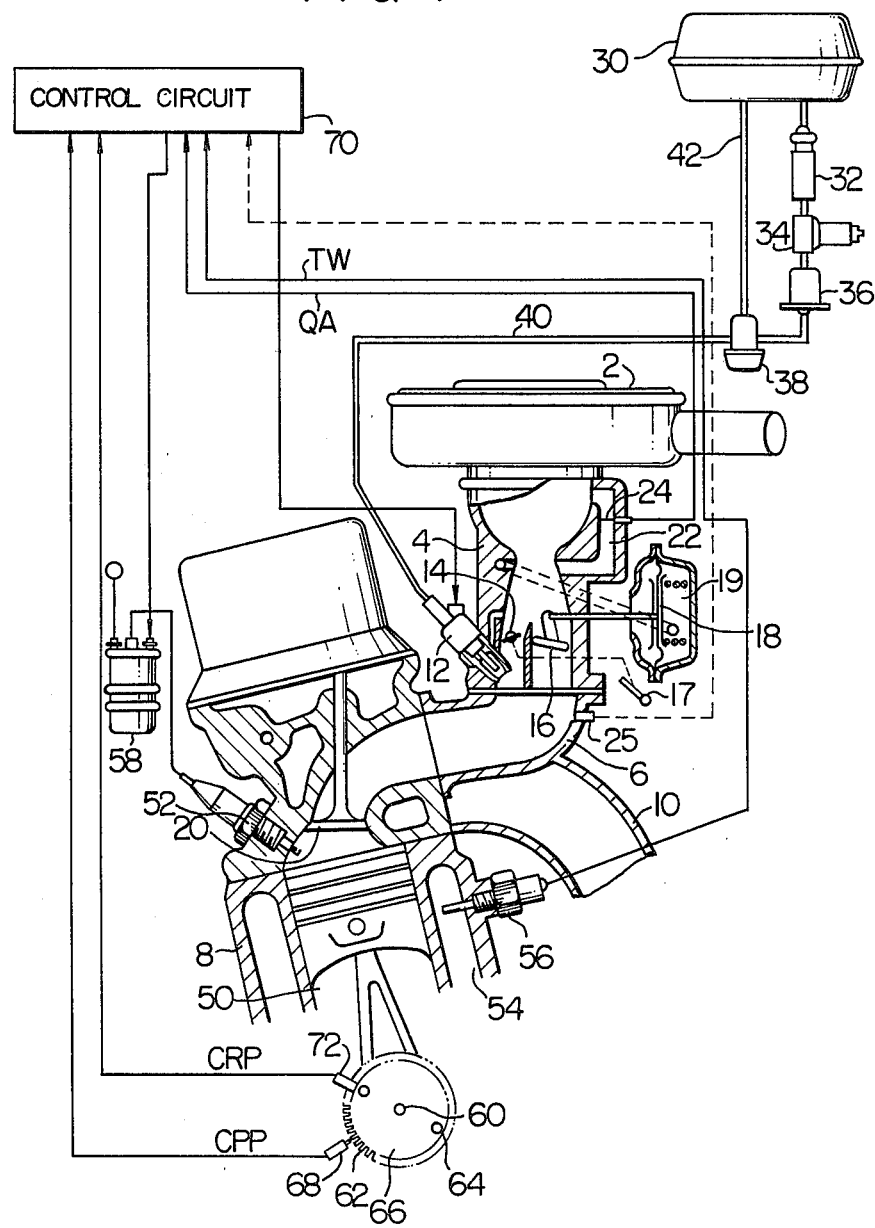
FIG. 1 is a diagram for explaining the overall engine system.

The present invention will be explained below in detail with reference to the embodiments shown in the drawings.

A control system for the overall engine is shown in FIG. 1. In this drawing, intake air is supplied to a cylinder 8 through an air cleaner 2, a throttle chamber 4 and an intake manifold 6. The gas burned in the cylinder 8 is discharged into the atmosphere via an exhaust tube 10 from the cylinder 8.

The throttle chamber 4 is provided with an injector 12 for injecting the fuel. The fuel injected from this injector 12 is atomized in the air passage of the throttle chamber 4, and forms a mixture gas with the intake air. This mixture gas is supplied through the intake manifold 6 to the combustion chamber of the cylinder 8 as the intake valve 20 opens.

Throttle valves 14 and 16 are provided near the outlet of the injector 12. The primary throttle valve 14 is mechanically interlocked with an acceleration pedal 17 and driven by the driver. The secondary throttle valve 16, on the other hand, is provided in such a position as to be driven by the difference in pressure between the atmosphere and the chamber 19 communicating with a negative pressure section. This secondary throttle valve 16 is closed in the range of a small amount of air flow rate, and with the increase in air flow rate, begins to be opened by an increase in the negative pressure exerted on the diaphragm 18, thus reducing the resistance of the intake air.

An air path 22 is provided upstream of the throttle valves 14 and 16 in the throttle chamber 4. An electrical heating element 24 constituting an air flow rate detector is arranged in this air path 22 to thereby produce an electrical signal which is determined from a relation between the air flow velocity and the amount of heat transmission of the heating element 24, which electrical signal thus changes with the air flow velocity. The heating element 24, which is arranged in the air path 22, is protected from both the high-temperature gas generated by the back fire of the cylinder 8 and from contamination by the dust or the like contained in the intake air. The output of this air path 22 is open to a position near the narrowest part of the venturi, while the inlet thereof is open to the upstream side of the venturi. The heating element 24 may be replaced by a negative pressure sensor with equal effect.

The fuel supplied to the injector 12 is supplied to a pressure regulator 38 from a fuel tank 30 through a fuel pump 32, a fuel damper 34 and a filter 36. On the other hand, pressurized fuel is supplied to the injector 12 from the pressure regulator 38 via a pipe 40. The fuel is adapted to be returned to the fuel tank 30 from the pressure regulator 38 through the return pipe 42 so that the difference between the pressure in the intake manifold 6 into which the fuel is injected from the injector 12 and the pressure of the fuel supplied to the injector 12 is always maintained constant.

The mixture gas introduced from the intake valve 20 is compressed by a piston 50 and is ignited by a spark generated from a spark plug 52, so that this combustion is converted into kinetic energy. The cylinder 8 is cooled by cooling water 54, the temperature of which is measured by a water temperature sesnor 56, and the resulting measurement is used as the engine temperature. The spark plug 52 is supplied with a high voltage from the ignition coil 58 at ignition timing.

The crank shaft 60 securely carries a rotary member 66 of magnetic material having teeth 62 at intervals of, say 0.5 degrees and two protrusions 64 on one side thereof at intervals of, say, 180 degrees in case of a four-cylinder engine. A crank position sensor 68 is arranged in opposed relation with the teeth 62 and generates a position pulse CPP for each 0.5-degree rotation of the crank shaft, which position pulse is supplied to a control circuit 70 including a microcomputer. The crank angle sensor 72 is arranged in opposed relation with the protrusions 64 and generates a reference crank angle pulse CRP for each 180-degree rotation of the crank shaft, which pulse CRP is supplied to the control circuit 70. The output TW of the water temperature sensor 56 and the electrical signal QA associated with the air flow rate which is produced from the heating member 24 are also applied to the control circuit 70. In response to these signals applied thereto, the control circuit 70 produces a control signal, whereby the injector 12 and the ignition coil 58 are driven.

Figure 2:
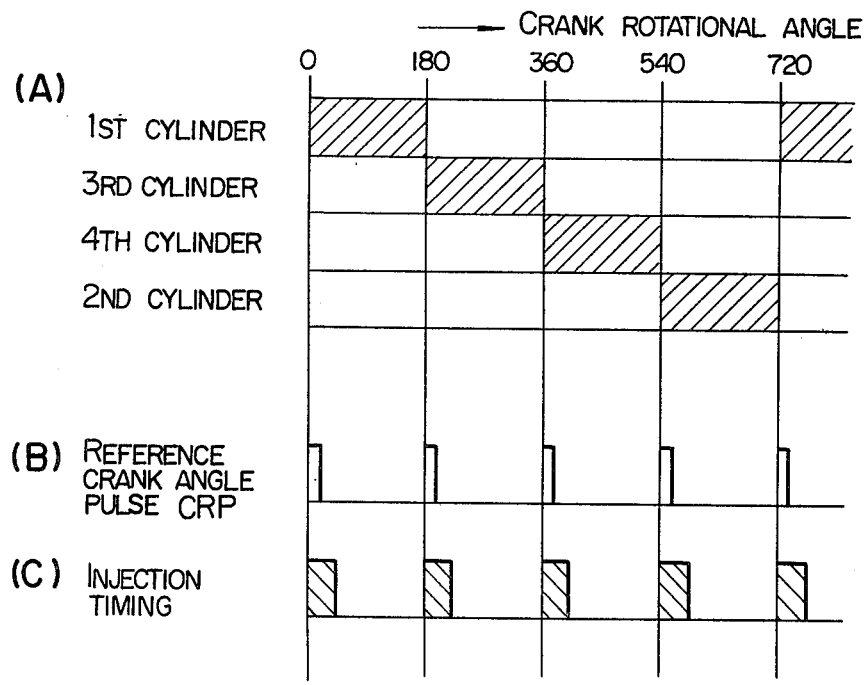
FIG. 2 is a time chart for explaining the operation timing of an engine.

The operation of the engine described above will be explained with reference to FIG. 2 showing the timing of fuel injection from the injector of a four-cylinder engine. The abscissa represents the rotational angle of the crank shaft of the engine. In FIG. 2(A), the intake stroke is shown in shaded form. As seen from the drawing, the intake stroke occurs at intervals of 180 degrees of the crank angle, so that the intake stroke is effected in the first cylinder in the range from 0 to 180 degrees, in the third cylinder in the range from 180 to 360 degrees, in the fourth cylinder in the range from 360 to 540 degrees, and in the second cylinder in the range from 540 to 720 degrees.

As shown in FIG. 2(B), a reference crank angle pulse CRP is produced at intervals of 180 degrees of crank angle. In response to this pulse, the injector valve is opened and the valve opening time of the injector 12 is determined from the result of a calculation made in the control circuit 70 on the basis of the data already obtained. The fuel injection time which represents the valve opening time of the injector 12 is shown in FIG. 2(C).

Figure 3:
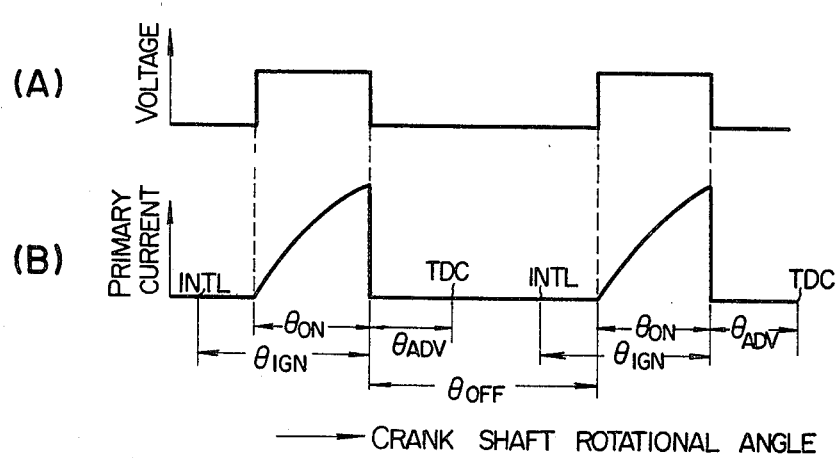
FIG. 3 shows waveforms for explaining the engine ignition timing control with reference to the relation between the crank shaft rotational angle and the ignition coil current.

The relation between the output of the control circuit 70 and the primary coil current of the ignition coil 58 is shown in FIG. 3. The rectangular wave shown in FIG. 3(A) is a signal applied from the control circuit 70 to the drive circuit of the ignition coil 58. This rectangular wave causes current having the waveform of FIG. 3(B) to flow in the primary winding of the ignition coil 58.

At the rise point of the rectangular wave of FIG. 3(A), the power transistor in the drive circuit begins to conduct so that the current in the primary winding of the ignition coil 58 rises as shown in FIG. 3(B). At the fall point of the rectangular wave voltage of FIG. 3(A), the power transistor is cut off, thus cutting the current as shown in FIG. 3(B). At this time point, ignition occurs.

In FIG. 3(B), TDC indicates top dead center which is reached by each of the cylinders at intervals of 180-degrees of rotation of the crank shaft in the case of a four-cylinder engine. The character $\theta_{ADV}$ shows an ignition advance angle which indicates the angle from the ignition point to top dead center. The character INTL shows a reference angle corresponding to the time point of generation of a reference crank angle pulse. The ignition timing is determined by the angle $\theta_{IGN}$ with respect to the reference angle INTL. The ignition advance angle $\theta_{ADV}$ is controlled by changing the angle $\theta_{IGN}$ as described later. The character $\theta_{ON}$ shows the conduction time of the power transistor of the drive circuit, which conduction time is controlled by changing the angle $\theta_{OFF}$ from the immediately preceding ignition timing. These angles $\theta_{IGN}$ and $\theta_{OFF}$ are calculated from the signal produced from the table stored in the memory of the control circuit 70 on the basis of the intake air flow rate and the engine revolutional speed.

As explained above, there are two objects of control in the ignition system. One is the ignition timing determined by the angle $\theta_{IGN}$, namely, the cut-off point of the current in the primary winding, and the other is the conduction start point of the primary winding determined by the angle $\theta_{OFF}$. These two data are produced from the control circuit 70 in the form of a rectangular wave pulse.

Next, the control circuit 70 will be described with reference to FIG. 4 showing a specific block of the control circuit. In the drawing, input signals are roughly divided into three types. A first group includes the output QA of the heating member 24 for detecting the intake air flow rate, the output TW of the sensor 56 for detecting the temperature of the engine cooling water and other analog input signals. These analog input signals are applied to a multiplexer (hereinafter referred to as MPS occasionally) 100, in which the outputs of the sensors are selected by time division and applied to an analog-digital converter 102 for conversion into digital values. Secondly, an on-off signal is applied, such as a signal 104A supplied from the switch 104 operatively interlocked with the throttle valve 14. This switch 104, which is kept normally on, is turned off by depressing the acceleration pedal, thus producing a signal 104A. This signal may be handled as a 1-bit digital signal.

A third type of input signals includes a pulse train such as a reference crank angle pulse CRP and a position pulse signal CPP supplied from the crank angle sensor 72 and the crank position sensor 68 respectively. In the case of a four-cylinder engine, the crank angle pulse is generated at intervals of 180 degrees of crank angle; at intervals of 120 degrees in the case of a six-cylinder engine; and at intervals of 90 degrees in the case of an eight cylinder engine. The position pulse, on the other hand, is produced at intervals of, say, 0.5 degrees of crank angle.

Numeral 108 shows a central processing unit for digital calculation, and numeral 110 shows a ROM which is a memory for storing a control program and fixed data. Numeral 112 is a RAM which is a memory unit from and into which data may be read and written respectively. An input-output interface circuit 114 supplies a signal to CPU 108 in response to the signals from the A-D converter 102, the switch 104 and the sensors 68 and 72. Further, the input-output interface circuit 114 applies the injection signal INJ and the ignition signal IGN from CPU 108 to the drive circuits 120 and 158 for the injector 12 and the ignition coil 58 respectively. The injector 12 and the ignition coil 58 include a solenoid for driving the valve and the primary winding for storing electromagnetic energy respectively. One end of each of the solenoid and the primary winding is connected to a power supply, and the other end thereof is connected to the drive circuits 120 and 158. The current flowing into the injector 12 and the ignition coil 58 is controlled by the control circuit 70.

EAROM (electrically alterable ROM) 122 is a nonvolatile memory unit for storing correction values for correcting data values representative of the output QA of the flow rate sensor 24 or the negative pressure sensor 25 as an alternative to the flow rate sensor 24, and the output of the crank angle sensor 72. EAROM 122 is a semiconductor memory unit having a storage function similar to ROM 110 or RAM 112, in which the data is capable of being electrically rewritten externally. In spite of the freedom of rewriting, unlike RAM 112, the data stored in the EAROM 122 is retained even when power is cut off.

The correction values for correcting in various ways data values representative of the outputs of the sensors are stored in EAROM 122. Especially according to the present invention, in view of the feature that data values representative of the outputs of the sensors are corrected at the time of delivery or subsequent regular inspections to thereby to control the engine in the best setting, the correction values relating thereto are stored in EAROM 122.

Corresponding to the EAROM 122, the input-output interface circuit 114 is provided with an adjustment switch 124 at the first input port PORT 1 and a selection switch 126 at the second input port PORT 2. Selection switch 126 comprises three switches $SW_0$, $SW_1$ and $SW_2$, for selectively setting a binary data pattern to be coupled to PORT 2, as shown in FIG. 5. The adjustment switch 124, which is provided for the purpose of determining a correction value for changing, if required, the data stored in EAROM 122 as mentioned later, comprises a neutral contact NEU 124A, an incremental contact INCSW 124B and a decremental contact DECSW 124C. The contacts 124A, 124B and 124C are grounded respectively through resistors 125A, 125B and 125C. One of the contacts 124A, 124B and 124C is selectively connected to the common terminal of switch 124. The contact thus made is adapted to be impressed with a predetermined voltage from the voltage source terminal 116 and raised to "high" level. The resistors 125A, 125B and 125C are provided for making sure that any of the contacts 124A, 124B and 124C which is off is held at low level.

Figure 6:
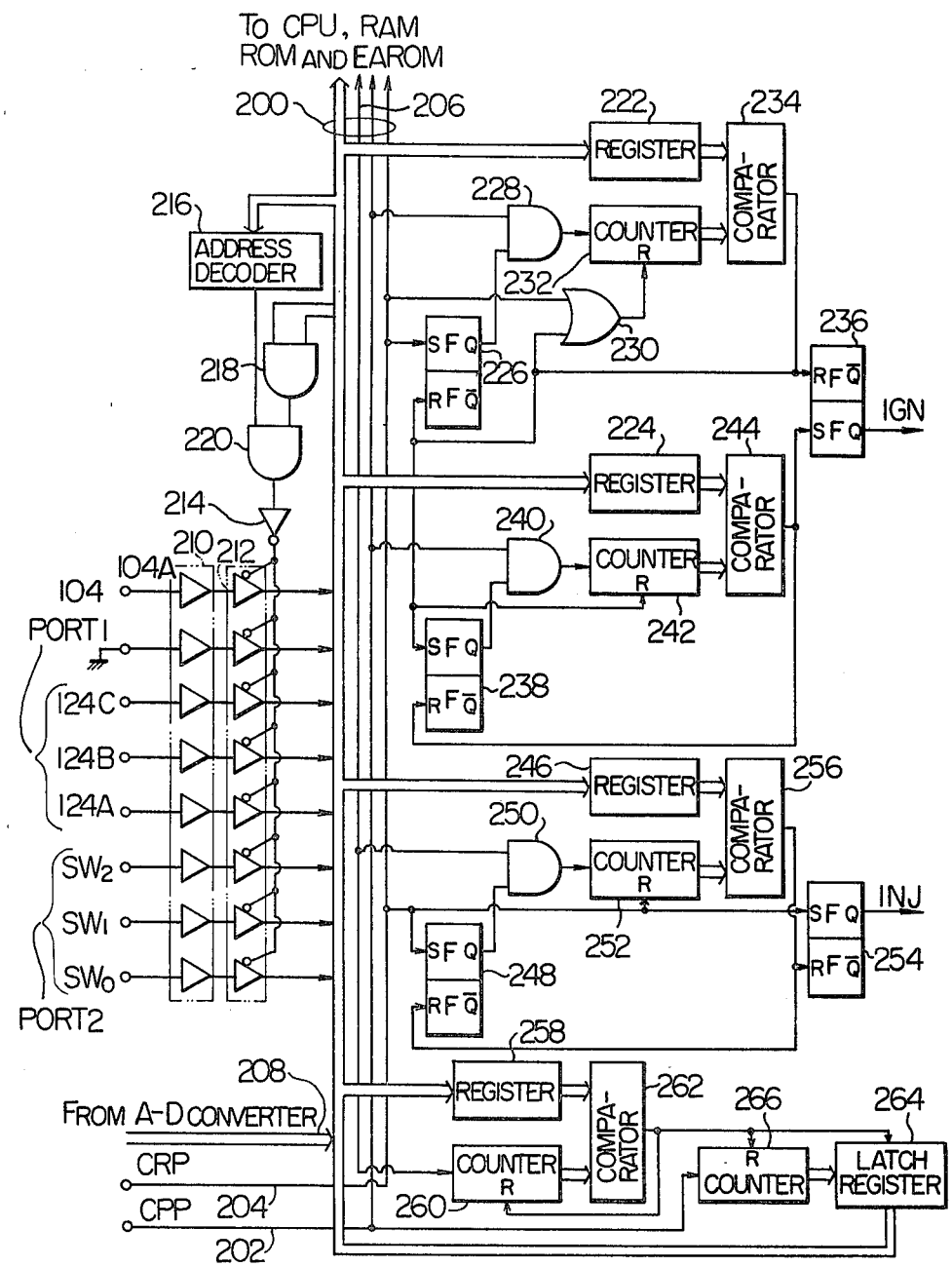
FIG. 6 is a block diagram showing the input-output interface of FIG. 4 in detail.

A block diagram showing in detail the data in the input-output interface circuit 114 of FIG. 4 is illustrated in FIG. 6. In this drawing, a bus 200 includes an address bus, a data bus and a control bus connected to the CPU 108, ROM 110, RAM 112 and EAROM 122. The bus 200 includes a line 202 for passing the position pulse CPP from the crank position sensor 68, a line 204 for passing the crank angle pulse CRP from the crank angle sensor 72 and a line 206 for passing a clock pulse from CPU 104. The output of the A-D converter 102 is connected via the bus 208 to the bus 200. The inputs to the PORT 1 from the contacts 124A, 124B and 124C and the input to PORT 2 from the switches $SW_0$, $SW_1$ and $SW_2$ are amplified by the amplifiers 210 and coupled to the bus 200 through tristate drivers 212. When the output of the inverter 214 is at a low level, the inputs and outputs of the tristate drivers 212 are interconnected, while when the output of the inverter 214 is at a high level, the inputs and outputs of the tristate drivers 212 are cut off from each other. The address decoder 216 is for decoding the data in the address bus of the bus 200 and the output thereof becomes high upon receipt of a command to read the data passing through the tristate drivers 212. In timing with this, a read signal is applied to one of the input terminals of the AND gate 218, and a timing pulse is applied to the other input terminal of the AND gate 218 upon completion of preparation for data receipt, thus raising the level thereof to a high level. At the same time, the output of the AND gate 220 becomes high, and therefore the output of the inverter 214 becomes low, so that the 8-bit data is coupled through the tristate drivers 212.

As long as the engine is being driven, data for controlling the ignition timing is read out of the table stored in the ROM 110 in response to the data taken in at each moment. On the basis of the data read out, the engine control signals $\theta_{IGN}$ and $\theta_{OFF}$ are obtained by the method mentioned later. The procedures for obtaining the signals $\theta_{IGN}$ and $\theta_{OFF}$ are disclosed in Japanese Patent Application No. 17329/79 dated Feb. 19, 1979 and U.S. Pat. No. 4,298,941, and will not be described in detail in this specification since they are not the gist of the present invention.

The signal $\theta_{IGN}$ is stored in the ignition timing setting register 222 through the bus 200 at a predetermined timing, while the signal $\theta_{OFF}$ is stored at a predetermined timing in the register 224 for setting the current cut-off period of the ignition coil. The crank angle pulse CRP of FIG. 7(A) taken from the line 204 sets the flip-flop 226 at time point $t_1$ to thereby enable the AND gate 228 on the one hand, and resets the counter 232 via the OR gate 230 to thereby reduce the data therein to zero on the other hand. Thus, position pulses CPP of FIG. 7(B) received from the line 202 are counted by the counter 232 through the AND gate 228, the count thereof being increased with time as shown in FIG. 7(C). The comparator 234 is for comparing the count in the counter 232 with the value $\theta$IGN stored in the register 222. When the count of the counter 232 coincides with the stored value $\theta_{IGN}$ of the register 222, the output of the comparator 234 rises from a low to a high level. At this time point $t_2$, the flip-flop 226 is reset, the counter 232 is reset through the OR gate 230 and the flip-flop 236 is reset. As a result, the output of the comparator 234 takes a pulse waveform which rises with slight time delay as shown in FIG. 7(D). This pulse wave further sets the flip-flop 238 at the time point $t_2$, so that the AND gate 240 is enabled and the counter 242 is reset. At time point $t_2$, therefore, the counter 242 begins to count the position pulses CPP, and this count value increases with time as shown in FIG. 7(E). The comparator 244 compares the count of the counter 242 with the value $\theta_{OFF}$ stored in the register 224, and when these two values coincide with each other, the output thereof changes to a high level. At this time point $t_3$, the flip-flop 238 is reset, and the AND gate 240 is disabled, thus holding the count of the counter 242. At the same time, the flip-flop 236 is set. As a result, the flip-flop 236 produces a pulse which falls at time point $t_2$ and rises at time point $t_3$ as shown in FIG. 7(F). This output pulse is applied to the ignition coil drive circuit 158, so that current is supplied to the ignition coil as long as this pulse is high in level. This means that the ignition is effected at the fall time $t_2$ thereof.

The control signals $\theta_{IGN}$ and $\theta_{OFF}$ stored in the registers 222 and 224 are updated to suit the engine operating condition at the time points $t_4$ and $t_5$ subsequent from the rise time points $t_2$ and $t_3$ of the outputs of the comparators 234 and 244 respectively. Similar operations are repeated.

The data Ti indicating the fuel injection period is stored in the register 246 through the bus 200 at a predetermined timing. The crank angle pulse CRP from the line 204 sets the flip-flop 248 at time point $t_1$ to thereby enable the AND gate 250 on the one hand and resets the counter 252 to thereby reduce the data therein to zero on the other hand, while at the same time setting the flip-flop 254. Thus the clock pulses shown in FIG. 7(G) are supplied to the counter 252 through the AND gate 250 from the line 206 at time point $t_1$. The count of the counter 252 increases from time point $t_1$ as shown in FIG. 7(H). The comparator 256 compares the count in the counter 252 with the data in the register 246 and produces an output of a high level as shown in FIG. 7(I) when they coincide with each other. At this time point $t_6$, the flip-flops 248 and 254 are reset, the AND gate 250 is disabled, the count of the counter 252 is held, and the output of the flip-flop 254 takes the form of a pulse which rises at time point $t_1$ and falls at the time point $t_6$ as shown in FIG. 7(J). This pulse is applied to the drive circuit of the injector 12 as an injection signal INJ, thus injecting the fuel during the high-level period thereof.

Next, a circuit for detecting the engine revolutional speed will be described. In view of the fact that the engine revolutional speed can be determined from the position pulses CPP counted within a predetermined period of time, a time period for which the position pulses CPP are to be counted is set in the register 258 via the bus 200. The counter 260 counts the clock pulses from the line 206 all the time. When this count coincides with the data in the register 258 at time point $t_7$, the output of the comparator 262 is raised to a high level and the counter 260 is reset. Thus the count of the counter 260 changes in saw-tooth form as shown in FIG. 7(K), and the comparator 262 produces pulses as shown in FIG. 7(L). The period of each of these pulses corresponds to the time set in the register 258. These pulses set the data of the counter 266 in a latch register at the rise point thereof, and reset the counter 266 at the fall point thereof. The counter 266 counts the position pulses CPP all the time and is reset periodically by the pulse (L) from the comparator 262, thus producing a count value in saw-tooth form as shown in FIG. 7(M). The maximum value of this count, namely, the count of the position pulses within the time period set in the register 258 is transferred to the latch register 264 at the timing shown in FIG. 7(N) and then supplied through the bus 200 to CPU 108 where it is processed to determine the engine revolutional speed.

In the above-mentioned configuration, the correction data are stored in EAROM 122 as mentioned below.

In the case where the value of PORT 2 is zero as shown in FIG. 5, the selection switch 126 is not in operation, and none of the stored data is corrected. When the $SW_0$ of the selection switch 126 is operated, the value of PORT 2 is "1". In this embodiment, the correction value for the angle $\theta_{IGN}$ is set in accordance with the crank position pulse CRP from the crank position sensor 72. In the case where the value of PORT 2 is "2" by operation of the selection switch $SW_1$, the initial value of the negative pressure sensor or the flow rate sensor 24, namely, the value thereof in the engine stationary state is stored. In the case where PORT 2 takes the value "3", on the other hand, data values for correction of the other data as desired may be stored.

The adjustment of the crank angle sensor 72 may be effected by correcting the angle $\theta_{IGN}$ from the time point INTL of generation of an output from the crank angle sensor 72 to the engine ignition time point as shown in FIG. 3. A device for taking a timing is generally used for this purpose. Specifically, a timing lamp is provided for emitting light at the actual engine ignition timing in response to an ignition current shown in FIG. 3(B), and a rotary pulley for receiving the light from the timing lamp is mounted on the crank shaft, so that whether or not the ignition timing is proper is determined by visually confirming a point on the rotary pulley. In other words, the rotary pulley appears to be stationary and thus the angle $\theta$IGN is adjusted in such a manner as to attain the desired advance ignition timing by reference to a mark point on the pulley. This adjustment is made at the time of idling of the motor vehicle. Under the idling state, the characteristics of the engine control signal are substantially unchanged for small variations in engine speed, and therefore accurate adjustment is possible. Thus, either the incremental contact INCSW 124 or the decremental contact DECSW 124C of the adjust switch 124 is operated to establish a timing reference, and when a timing reference is established, the neutral contact NEUSW 124A is closed. As a result, the correction value to be applied to the output of the crank angle sensor is set and stored in EAROM 122, so that subsequent outputs of the crank angle sensor always incorporate the corrected data of EAROM 122.

For the purpose of storing the initial value of the flow rate sensor 24 in EAROM 122, the switch $SW_1$ of the selection switch 126 is operated to set a "2" at the input of PORT 2 and the detection value $QA_I$ of the sensor 24 for the stationary state of the engine is stored in EAROM 122. In the case where a negative pressure sensor is used in place of the flow rate sensor, the detection value of the negative pressure sensor for the engine stationary condition is coupled into EAROM 122 as an initial value. By the way, the flow rate sensor may be replaced by means for detecting the opening angle of the throttle valve with equal effect. In this case, the initial value of the output of the throttle sensor, namely, the output of the throttle sensor with the throttle valve fully open and the output of the throttle valve closed up are stored in EAROM 122. Specifically, in view of the fact that the throttle sensor is comprised of a potentiometer interlocked with the throttle, the initial values stored in EAROM 122 comprise a value associated with the key switch turned on and the throttle valve fully open, i.e., the acceleration pedal depressed to the utmost end thereof, and a value associated with the throttle valve closed up, namely, the acceleration pedal not depressed.

Explanation will be made below of a program for storing the correction data in EAROM 122.

This program is executed at the time of delivery or at regular inspections of the motor vehicle but not during the running thereof. This program is shown in FIG. 8 and is started at regular intervals of time, say, every 500 milliseconds.

In FIG. 8, the program is recycled at intervals of 500 msec at step 132. At step 134, it is determined whether or not the input value of PORT 2 is "0", namely, how the selection switch 126 is operated. If PORT 2 is "0", it indicates the absence of a sensor adjustment command, and therefore a jump instruction is issued without any operation. If it is determined that the input value of PORT 2 is not "0" at step 134, it is determined at step 136 whether or not the value of PORT 2 is "1". If it is determined as "1", the data representative of the reference angle INTL of the crank angle sensor 72 is corrected. In this case, the on or off state of the incremental switch 124B of the adjustment switch 124 is determined at step 138.

If it is determined that the incremental switch 124B is on at step 138, the correction value $\Delta\theta$ of the reference angle stored in a predetermined address of EAROM 122 (which value is zero at the time of initial program execution at the time of delivery) is read out and the value 1 is added thereto at step 140. This value 1 represents the rotational angle between the teeth of the rotary member which are detected by the crank position sensor 68. The value $\Delta\theta+1$ obtained at step 140 is stored at a predetermined address of EAROM at step 142 and passed to EXIT. With an increase of the correction value $\Delta\theta$ by 1, the tail end of the rotational range of the angle $\theta_{IGN}$ in FIG. 3 is delayed by an angle corresponding to one tooth 62 of the rotary member 66, thus delaying the ignition timing accordingly. In other words, an increase of the correction value $\Delta\theta$ causes the value $\theta_{IGN}$ stored in the register 222 to be increased by 1, thus leading to a delay by one position pulse CPP of the rise point $t_2$ of the output of the comparator 234, with the result that the fall point of the output IGN of the flip-flop 236, namely, the spark ignition timing, is retarded by one pulse CPP.

In the case where the incremental switch 124B is determined to be off at step 138, on the other hand, the on or off state of the decremental switch 124C is determined at the next step 144. If it is determined that the decremental switch 124C is on at step 144, the correction value of the crank angle sensor stored in advance is reduced by 1 at step 146, as indicated by symbols $\Delta\theta-1\rightarrow\Delta\theta$. The data value thus altered is stored in EAROM 122 at step 148. The correction value $\Delta\theta$ stored in EAROM 122 is updated at regular intervals of 500 msec as long as the incremental switch 124B or the decremental switch 124C is on. In the case where it is determined at step 144 that the decremental switch 124C is off, the neutral switch position 124A of the adjustment switch 124 is on so that the data stored in EAROM 122 is not updated. When it is confirmed visually that the ignition timing reference is established, by the above-mentioned device for establishing an ignition timing setting, therefore, the adjustment of the crank angle sensor is completed by setting switch to the neutral position 124A.

Next, in the case where the value of PORT 2 is not 1 at step 136, it is determined whether or not the value of PORT 2 is 2 at the next step 150. If it is decided that PORT 2 is not 2 at step 150, this task is completed.

If the value of PORT 2 is determined as 2 at step 150, the initial value of the air flow rate sensor 24 or the negative pressure sensor 25 according to the present embodiment is stored.

The initial value of the air flow rate sensor is detected for the engine stationary condition, and therefore whether or not the engine is running is determined at step 152, and if it is determined as running, the program arrives at the EXIT. If it is determined that the engine is not running, however, the detection value produced from the sensor 24 is stored in RAM 112 through the multiplexer 100 and the A-D converter 102 at step 154. ROM 110 contains a table to be read in accordance with the values of engine speed, air flow rate or the like. If the detection value of the sensor 24 includes an error, the data read out of the table is inaccurate and therefore the detection value of the sensor 24 is required to be corrected in a manner to be adapted to the flow rate tabulated in advance. Generally, the air flow rate and the detection value of the sensor 24 are in satisfactory proportional relation and therefore the engine is controlled optimally by adaptation of the initial value. For this reason, at step 156, the initial value $QA_I$ of the flow rate used as a reference in preparing the table is read out of ROM 110 and the difference thereof from the initial value obtained from the sensor 24 is calculated, which difference is used as the correction value $QA_I$. This correction value $QA_I$ is stored in EAROM 122 at step 158.

Next, the execution program in an engine control using the correction data stored in EAROM 122 will be explained with reference to FIG. 9.

At the start of the program, data representative of the output QA of the flow rate sensor or the output VC of the negative pressure sensor and the water temperature TW of the engine are obtained at step 172. These output data which are derived from the sensors are converted into digital signals and introduced into the input-output interface device 114.

Among these data valves, the data representative of the output QA of the flow rate sensor or the output VC of the negative pressure sensor is corrected by the data stored in EAROM 122 at step 174. Specifically, the initial value of the flow rate sensor or the negative pressure sensor is stored in EAROM 122 and is added to the data obtained at step 174, thus correcting the same to a value suitable for searching the table stored in ROM 110.

The table is searched in ROM 110 at the next step 176 on the basis of the output corrected QA of the flow rate sensor or the output VC of the negative pressure sensor and the output of the crank angle sensor. This table search is effected in order to determine the ignition advance angle $\theta_{ADV}$, namely, in order to set the angle $\theta_{IGN}$ to be stored in the register 222 of FIG. 6. At step 176, the angle $\theta_{IGN1}$ is calculated from the relation $\theta_{IGN1}=f(N, QA)$ or $\theta_{IGN1}=f(N, VC)$, where N is the engine rotational speed obtained from the data stored in the latch register of FIG. 6 and f a function.

At the next step 178, the angle $\theta_{IGN2}$ is obtained from the engine water temperature TW, in view of the fact that the ignition advance angle $\theta_{ADV}$ is required to be reduced while water temperature is low such as during the engine warm-up.

At the next step 180, the value $\theta_{IGN3}$ is determined from the values $\theta_{IGN1}$ and $\theta_{IGN2}$ calculated above. Specifically, at step 180, $\theta_{IGN1}$ and $\theta_{IGN2}$ are added to each other to thereby determine the ignition advance angle $\theta_{IGN3}$. The value $\theta_{IGN2}$ is adapted to be reduced to zero at a water temperature higher than a predetermined level.

At step 182, the value $\theta_{IGN3}$ thus obtained is added to the correction value $\Delta\theta$ stored in EAROM 122, thereby determining the value $\theta_{IGN}$ to be stored in the register 222 in FIG. 6. This value $\theta_{IGN}$ is stored in the register 222 of the input-output interface circuit 114 at step 184, thus completing this task.

This program is executed for normal engine control, in which case the correction data stored in EAROM 122 at the time of pre-delivery adjustment is always used.

The correction data stored in EAROM 122 are set as adjusted values at the time of delivery and subsequent regular inspections without any mechanical adjustment, and subsequent controls are effected at the best setting, so that the engine is driven very satisfactorily. In this way, the engine control response is improved on the one hand and the service life of the engine is lengthened on the other hand, thus greatly contributing to a reduction in exhaust gas and a saving of fuel cost.

Especially, the fact that the correction data are stored in EAROM 122 to correct the data of the sensor outputs completely eliminates the need of selecting the sensor-mounting positions adjustably or mechanical zero adjustment unlike in the prior art systems. Further, the correction according to the present invention is effected on the basis of actual measurements, and therefore it is set very easily, thus making possible engine control under the designed condition ideally.

The adjustment program of FIG. 9 is associated with the correction of the output of the crank angle sensor. This invention, however, is not limited to this type of control but may be used effectively for correction of the outputs of the various sensors carried on the motor vehicle.

It will be understood that according to the present invention the complicated adjustments are eliminated which otherwise might be required at the time of delivery or subsequent regular inspections and also the best set condition is easily attained, thereby leading to a high meritorious effect of reduction in exhaust gas and saving of fuel cost in engine control.

What is claimed is:

1. In a method for controlling an engine in which an engine control signal is generated on the basis of a signal detected from at least one sensor for detecting an engine operating condition while the engine is being operated the improvement comprising
    (a) a first step of storing in a memory correction data which corresponds to a correction value of data representative of the detection signal produced from said at least one sensor in a manner to maintain the engine in a proper operating condition,
    (b) a second step of producing said engine control signal on the basis of data representative of a signal detected from said at least one sensor and said correction data stored in said memory, and
    (c) a third step of controlling the operating condition of said engine in accordance with said control signal.

2. A method for controlling an engine according to claim 1, in which said first step further comprises a step of electrically adjusting data representative of the signal detected from said at least one sensor and a step of storing in said memory the correction data used for correction of said detection signal data which is obtained by said adjustment.

3. A method for controlling an engine according to claim 2, in which said adjusting step is such that the ignition timing of said engine is adjusted on the basis of data representative of the detection signal produced from a sensor for detecting the rotational angle of a rotational shaft driven by said engine.

4. A method for controlling an engine according to claim 1, in which said first step comprises a step of storing in the memory a reference value of a signal for searching a table of engine control data stored in said memory, a step of adjusting data representative of the signal detected by said at least one sensor on the basis of said reference value, and a step of storing in said memory the correction data obtained from said adjusting step.

5. A method for controlling an engine according to claim 4, in which a detection signal from a sensor for detecting the intake air flow rate for an engine stationary condition is adjusted in said adjusting step.

6. A method for controlling an engine according to claim 1, 2 or 3, in which said second step comprises a step of reading engine control data from a table stored in said memory on the basis of the detection signal from said at least one sensor, and a step of producing said engine control signal by correcting said control data on the basis of the correction data stored in said memory.

7. A method for controlling an engine according to claim 1, in which said second step comprises a step of correcting data representative of the signal detected by said at least one sensor by the correction data stored in said memory and a step of reading the engine control signal from the table stored in said memory on the basis of the signal corrected at said correction step.

8. A method for controlling an engine according to claim 1, in which said first step includes a step of storing a plurality of correction data, and said second step includes a step of correcting the data representative of the signal detected by a first sensor by a first correction data stored in said memory, a step of reading engine control data from the table stored in said memory on the basis of the signal corrected at said correction step, and a step of producing said engine control signal from said engine control data and second correction data stored in said memory.

9. A method for controlling an engine according to claim 8, in which said second step further includes a step of calculating said second correction data on the basis of the signal detected at a second sensor, and a step of correcting said engine control data on the basis of said correction value calculated at said calculation step.

10. An engine control system wherein an engine control signal is produced on the basis of data representative of a signal detected from at least one sensor for detecting an operating condition of an engine being operated said system comprising:
    (a) means for adjusting data representative of a detection signal of said at least one sensor in a manner to attain the proper operating condition of the engine;
    (b) a memory for storing correction data corresponding to a correction value of said data representative of the detection signal in response to said adjusting means;
    (c) means for producing said engine control signal on the basis of data representative of a detection signal from said at least one sensor and said correction data stored in said memory; and
    (d) means for controlling the operation of said engine on the basis of the control signal produced from said control signal generating means.

11. An engine control system according to claim 10, in which said adjusting means includes means for selecting a sensor to be adjusted.

12. An engine control system according to claim 10, in which said adjusting means includes means for adjusting the ignition timing of the engine on the basis of the detection signal of the sensor for detecting the rotational angle of the rotational shaft driven by said engine.

13. An engine control system according to claim 12, in which said ignition timing adjusting means includes means for issuing a command for delaying the ignition timing, and means for delaying the ignition timing in compliance with said command.

14. An engine control system according to claim 10, in which said memory is a non-volatile memory which is capable of being written and read.

15. An engine control system according to claim 10, further comprising ROM for storing a table from which engine control data can be read on the basis of data representative of the detection signal of the sensor for detecting the engine operating condition and a reference value of the signal for searching said table.

16. An engine control system according to claim 15, in which said adjusting means includes means for correcting data representative of the detection signal of said at least one sensor by the reference value stored in said ROM.

17. An engine control system according to claim 15, in which said control signal generating means includes means for correcting the control data read out of said table of said ROM on the basis of data representative of said detection signal of said engine operating condition sensor by the correction data read out of said memory.

18. An engine control system according to claim 17, in which said control data is further corrected by the correction data calculated on the basis of data representative of the detection signal of an engine cooling water temperature sensor.

19. An engine control system according to claim 10, in which said operation control means includes a register for storing said control signal, a counter for counting the detection signal from a sensor for detecting pulses produced in accordance with the engine revolutional speed, means for starting the counting operation of said counter in synchronism with the detection signal from the sensor for detecting the rotational angle of the rotational shaft driven by the engine, and ignition means for taking an ignition timing when the count of said counter reaches the count corresponding to the data stored in said register.

20. A method of operating a processor-controlled engine in which processor-derived control signals are produced in response to output signals from at least one sensor means for detecting at least one operation condition of the engine comprising the steps of:
  (a) obtaining a reference value in response to an output signal of a sensor means for detecting a preselected operational condition of the engine for a prescribed state of operation of the engine, which reference value is representative of the amount by which the value of the output signal of said sensor means is to be modified in order to attain the proper operating condition of the engine;
  (b) storing, in memory, a correction value corresponding to said reference value, in dependence upon which processor-derived control signals are produced;
  (c) for a predetermined operational state of said engine, modifying a value representative of an output signal of the sensor means for detecting said preselected operational condition of the engine using said correction value stored in memory; and
  (d) producing an engine control signal on the basis of the modified output signal value obtained in step (c).

21. A method according to claim 20, wherein step (a) comprises the step of
  obtaining, as said reference value, an initial value of the sensor means corresponding to the stationary state of the engine.

22. A method according to claim 21, wherein said sensor means is comprised of an air flow rate sensor.

23. A method according to claim 21, wherein said sensor means is comprised of a negative pressure sensor.

24. A method according to claim 22, wherein said memory comprises a read only memory, the contents of which are selectively alterable.

25. A method according to claim 20, wherein step (d) comprises the steps of:
  (d1) storing, in memory, engine control signal data for various values of output signals of said sensor means;
  (d2) deriving, from said memory, engine control signal data on the basis of the value of the modified output signal value obtained in step (c); and
  (d3) producing said engine control signal in accordance with the engine control signal data derived in step (d2).

26. A method according to claim 25, further comprising the steps of:
  (e) obtaining a reference value of an output signal of a sensor means for detecting a predetermined operational condition of the engine for a preselected state of operation of the engine; and wherein step (d3) comprises
  producing said engine control signal in accordance with the engine control signal derived in step (d2) and the reference value obtained in step (e).

27. A method according to claim 26, wherein said sensor means for detecting a predetermined operational condition of the engine comprises means for detecting the rotational position of the engine crankshaft relative to a preselected location, and wherein said preselected state of operation of the engine corresponds to the idling state of said engine.

28. A method according to claim 27, wherein step (e) comprises the steps of:
  (e1) producing an output signal of the sensor means for detecting a predetermined operational condition of the engine for said preselected state of operation of the engine;
  (e2) detecting the amount by which the value of the output signal of the sensor means for detecting a predetermined operational condition of the engine is to be modified in order to cause the ignition advance angle to have a prescribed value; and
  (e3) storing, as said reference value, a value corresponding to the amount detected in step (e2).

29. In a method of controlling an engine in which an engine control signal is generated on the basis of a signal detected from at least one sensor for detecting an engine operating condition while the engine is being operated, the improvement comprising the steps of;
  during a first prescribed condition of the engine,
  (a) measuring the output of said at least one sensor and generating therefrom correction data for correcting data representative of a detection signal produced by said at least one sensor during said operating condition of the engine and storing said correction data;
  during said operating condition of the engine,
  (b) generating output data representative of the output of said at least one sensor;

(c) modifying said output data in accordance with said stored correction data;
(d) producing said engine control signal on the basis of said modified output data; and
(e) controlling said operating condition of the engine in accordance with said control signal.

30. A method according to claim 29, wherein step (a) comprises the steps of;
(a-1) storing in memory a table of values based upon values of data representative of the output of said at least one sensor;
(a-2) accessing a value from said table stored in memory in accordance with data representative of a measured output of said at least once sensor;
(a-3) in response to said accessed value representing an error in the data representative of the measured output of said at least one sensor, generating said correction data in accordance with the difference between the data representative of the measured output of said at least one sensor; and
(a-4) storing said correction data in memory.

31. A method according to claim 29, wherein said first prescribed condition of the engine corresponds to the non-running condition of the engine.

32. A method of operating a processor-controlled engine in which processor-derived control signals are produced in response to output signals from at least one sensor means for detecting at least one operational condition of the engine said at least one sensor means comprising means for detecting the rotational position of the engine crankshaft relative to a preselected location, and wherein said prescribed state of operation of the engine correspondence to the idling state of the engine, comprising the steps of:
(a) obtaining a reference value in response to an output signal of a sensor means for detecting a preselected operational condition of the engine for a prescribed state of operation of the engine; and
(b) storing, in memory, said reference value, in dependence upon which processor-derived control signals are produced; and wherein (a) comprises the steps of;
(a1) producing an output signal of the sensor means for detecting a preselected operational condition of the engine for said prescribed state of operation of the engine; and
(a2) detecting the amount by which the value of the output signal of the sensor means is to be modified in order to cause the ignition advance angle to have a prescribed value; and
wherein step (b) comprises the step of storing, as said reference value, a value corresponding to the amount detected in step (a2).

33. A method according to claim 32, wherein said memory comprises a read only memory the contents of which are selectively alterable.

* * * * *